United States Patent Office 3,244,719
Patented Apr. 5, 1966

3,244,719
ANTHRAQUINONE CARBAZOLE DYES
Willy Braun, Heidelberg, and Hermann Krantz, Mannheim, Germany, assignors to Badische Anilin- & Soda-Fabrik Aktiengesellschaft, Ludwigshafen (Rhine), Germany
No Drawing. Filed Aug. 20, 1963, Ser. No. 303,431
Claims priority, application Germany, Aug. 28, 1962, B 68,594
6 Claims. (Cl. 260—276)

This invention relates to new carbazole dyes of the anthraquinone series and their production. These new valuable dyes have the general Formula I:

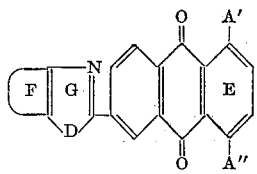

(I)

in which at least one of the substituents A stands for a group having the general formula —NH—B' in which B' denotes an α-anthraquinonyl radical or a radical derived from an α-anthraquinone derivative containing one to nine rings, and the radical B' may contain substituents, such as halogen atoms, acylamino groups, alkoxy groups and aryloxy groups, and is united in its β-position direct with the β-position of the ring E thus forming a carbazole, any remaining A denotes a hydrogen atom, D denotes oxygen, sulfur or a bridge member

in which R stands for a hydrogen atom, an alkyl radical or an aryl radical and F denotes a benzene or anthraquinone radical, which may bear substituents, anellated to the ring G.

The following compounds are examples of dyes of the general Formula I:

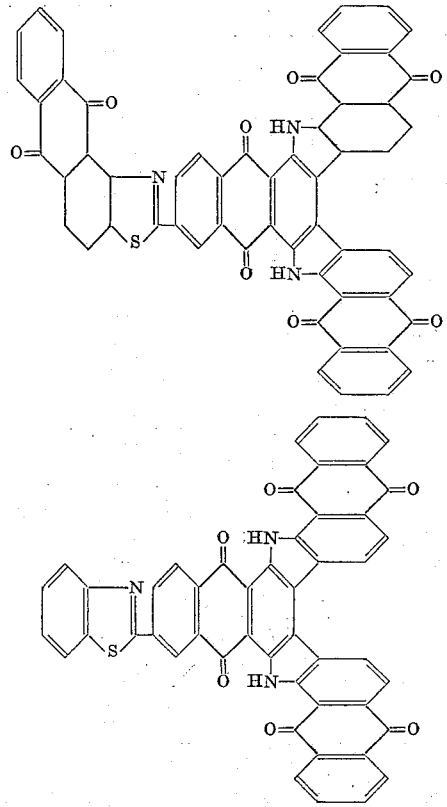

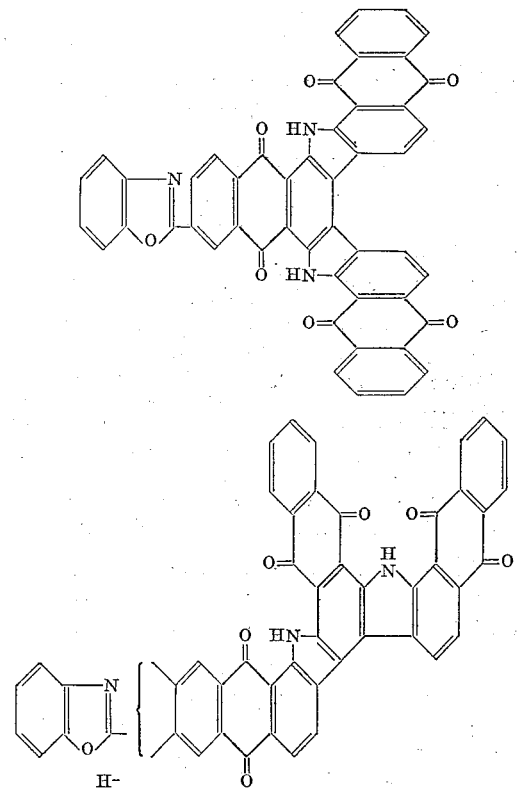

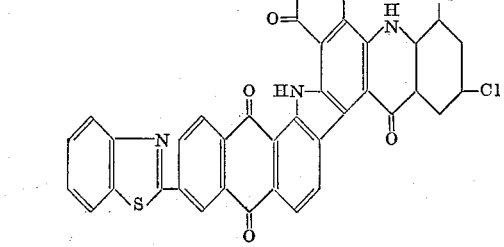

The new dyes are obtained by converting into a carbazole compound by conventional methods an anthrimide having the general Formula II:

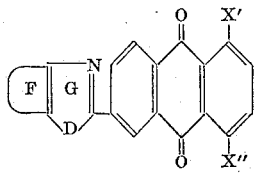

(II)

in which at least one of the substituents X stands for a group having the general formula —NH—B in which B denotes an α-anthraquinonyl radical or a radical derived from an α-anthraquinone derivative containing one to nine rings and the radical B may contain substituents such as halogen atoms, acylamino groups, alkoxy groups and aryloxy groups, and any remaining X denotes a hydrogen atom, D denotes oxygen, sulfur or the bridge member

in which R stands for a hydrogen atom, an alkyl radical or an aryl radical, and F denotes a benzene radical or anthraquinone radical, which may contain substituents, which is anellated to the ring G.

The carbazole compounds may be obtained advantageously by allowing acid condensing agents to act on anthrimides of the Formula II at about 20° to 200° C., preferably at 50° to 150° C., advantageously in the presence of diluents. In some cases it may be advantageous to aftertreat the reaction products with oxidizing agents.

The radical:

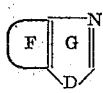

may be for example: benzoxazole, chlorobenzoxazole, benzothiazole, N - phenylbenzimidazole, 4,5 - phthaloylbenzoxazole, 5,6 - phthaloylbenzoxazole, 6,7 - phthaloylbenzoxazole, 4,5 - phthaloylbenzothiazole, 5,6 - phthaloylbenzothiazole or 6,7-phthaloylbenzothiazole.

The dianthrimides or trianthrimides having the general Formula II and serving as initial materials for the process are new. They may be prepared for example:

(a) By reacting a mixture of one mole of a compound having the general formula:

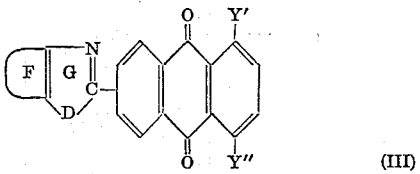

in which the radicals Y' and Y" stand for hydrogen or halogen atoms, preferably chlorine or bromine atoms but Y' and Y" are not both hydrogen atoms, and in which A and D have the meanings given above with the stoichiometric amount of an amine having the formula $H_2N$—B in which B has the above meanings, or (b) By reacting a mixture of one mole of a compound having the general formula:

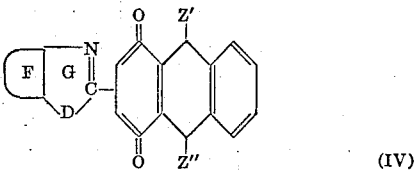

in which the radicals Z' and Z" stand for hydrogen atoms or amino groups but Z' and Z" are not both hydrogen atoms, and in which A and D have the meanings given above, with a stoichiometric amount of a compound having the formula Hal—B in which Hal denotes a halogen atom, preferably a chlorine or bromine atom and B has the meanings given above.

In the production of the initial materials according to (a) and (b) it is advantageous to use solvents which are inert under the reaction conditions, such as nitrobenzene or naphthalene, in the presence of copper powder and/or copper salts and acid-binding agents, such as sodium carbonate or potassium carbonate, at 150° to 220° C. No protection is claimed in the present application for the production of the initial materials.

Trianthrimides having the general Formula II in which the anthrimide radicals having the general formula —NH—B are different from each other are obtained when one mole of an anthraquinone compound having the Formula III or IV, in which both radicals Y denote halogen atoms or in which both radicals Z denote amino groups is reacted with one mole each of two different amines having the general formula $NH_2$—B or two different halogen compounds having the general formula Hal—B.

Examples of amines having the general formula $H_2N$—B are:

1-aminoanthraquinone,
1-amino-4-benzoylaminoanthraquinone,
1-amino-5-benzoylaminoanthraquinone,
5-aminoanthrapyrimidine,
4-amino-1,1'-dianthrimide,
1-amino-4-methoxyanthraquinone,
1-amino-6-chloroanthraquinone,
1-amino-7-chloroanthraquinone,
1-amino-6,7-dichloroanthraquinone,
4-amino-3',5'-dichloroanthraquinone-2,1(N)-1',2'(N)-benzene acridone and
3',5'-dichloro-4-[4"-aminoanthraquinonyl-(1")]-anthraquinone-2,1(N)-1',2'-benzene acridone.

Examples of halogen compounds having the general formula Hal—B are 1-chloroanthraquinone,
1-chloro-4-benzoylaminoanthraquinone,
1-chloro-5-benzoylaminoanthraquinone,
5-chloroanthrapyrimidine,
4-chloro-1,1',dianthrimide and
4,3',5'-trichloroanthraquinone-2,1(N)-1',2'(N)-benzene acridone.

The five-membered heterocyclic ring contained in 6-position of the anthraquinone molecule in the general Formulae III and IV, onto which a benzene radical or anthraquinone radical is condensed, may be introduced for example by heating 1,4-dichloroanthraquinone-6-carboxylic chloride with o-aminophenol in organic solvents, such as o-dichlorobenzene or nitrobenzene, if desired with an addition of catalytic amounts of p-toluenesulfonic acid and if desired exchanging the chlorine atoms by a conventional method for amino groups by means of p-toluenesulfonamide.

Examples of suitable acid condensing agents for the production from anthrimides of Formula II of the new carbazole compounds are aluminum bromide, iron chloride and particularly aluminum chloride. These condensing agents are advantageously used in the presence of diluents. Examples of such diluents are tertiary nitrogen compounds, such as pyridine, and also nitrobenzene, urea, acid amides or inorganic salts and also mixtures of these substances.

The reaction with acid condensing agents proceeds between about 20° and 200° C. and is preferably carried out at 50° to 150° C.

The new carbazole compounds may be prepared for example by introducing an anthrimide having the general Formula II into a melt consisting of an acid condensing agent and a diluent and then heating the mixture to the reaction temperature. In most cases the reaction is over within one to five hours. The reaction product is advantageously isolated by introducing the reaction mixture into water and filtering off the deposited dye with suction. If necessary the dye may be subjected to an oxidative aftertreatment. For this purpose the dye may be treated either in aqueous alkaline suspension with bleaching powder liquor or in aqueous acid suspension with potassium permanganate or sodium bichromate.

Dyeings and prints having a good to excellent fastness are obtained on cotton with the dyes obtainable according to this invention according to the dyeing methods usual for vat dyes.

The new dyes are also suitable as pigment dyes.

The invention is illustrated by the following examples in which the parts specified are parts by weight.

*Example 1*

25 parts of the trianthrimide obtainable according to the second paragraph of this example is introduced into a melt consisting of 200 parts of aluminum chloride and 30 parts of urea. The mixture is stirred under nitrogen at 120° C. for three hours, the hot melt poured into 1000 parts of water and the residue filtered off with suction. The filter residue is aftertreated in the conventional way with alkaline bleaching powder liquor. 20 parts of a dark brown powder is obtained which is soluble in concentrated sulfuric acid with a brown color and dyes cotton brown shades of excellent fastness from a brown vat.

15.8 parts of 2-[1',4'-dichloroanthraquinonyl-(6')]-benzoxazole, 18.3 parts of 1-aminoanthraquinone, 9.6 parts of anhydrous sodium carbonate, 2.4 parts of anhydrous sodium acetate, 0.1 part of copper oxide and 200 parts of naphthalene are boiled for twelve hours. The mixture is then diluted with 100 parts of chlorobenzene and the residue is filtered off with suction at a temperature of 100° C. The residue is washed with chlorobenzene and methanol and then boiled up with dilute hydrochloric acid. 27 parts of a reddish blue powder is obtained which is soluble in concentrated sulfuric acid with a green color.

2-[1',4'-dichloroanthraquinonyl - (6')] - benzoxazole is obtained by heating the acid chloride of 1,4-dichloro-anthraquinone-6-carboxylic acid with o-aminophenol in o-dichlorobenzene with the addition of a catalytic amount of p-toluenesulfonic acid.

Example 2

25 parts of the trianthrimide obtainable according to the second paragraph of this example is introduced at 100° C. in a melt of a mixture of 60 parts of aluminum chloride and 180 parts of pyridine. The reaction mixture is stirred for three hours at 120° C. The melt is then poured into excess aqueous caustic soda solution and 120 parts of bleaching powder liquor is added in small portions at 80° C. Then the residue is filtered off with suction, washed with water until neutral and dried. 23 parts of a brown powder is obtained which is soluble in concentrated sulfuric acid with a violet color and dyes cotton khaki shades having excellent fastness from a brown vat.

21 parts of 2-[1',4'-dichloroanthraquinonyl-(6')]-4,5-phthaloylbenzoxazole is reacted with 18.3 parts of 1-aminoanthraquinone, 9.6 parts of anhydrous sodium carbonate, 2.4 parts of anhydrous sodium acetate, 0.1 part of copper oxide and 200 parts of naphthalene in the way described in Example 1. 31 parts of a grey blue powder is obtained which dissolves in concentrated sulfuric acid with a green color.

2-[1',4'-dichloroanthraquinonyl-(6')] - 4,5 - phthaloyl-benzoxazole is obtained by the method described in the third paragraph of Example 1 but using 1-amino-2-hydroxyanthraquinone instead of o-aminophenol.

Example 3

25 parts of the trianthrimide obtainable according to the second paragraph of this example is introduced at 100° C. into a melt of 300 parts of aluminum chloride and 75 parts of sodium chloride. The mixture is stirred under nitrogen, the temperature being raised in the course of two hours to 170° C. The melt is stirred for another two hours at this temperature and poured without previous cooling into dilute hydrochloric acid. The residue is filtered off with suction and aftertreated in the usual way with chloride of lime liquor and worked up. 20 parts of a dark powder is obtained which is soluble in concentrated sulfuric acid with a brown color and which dyes cotton brown shades having very good fastness from a brown vat.

21 parts of 2-[1',4'-dichloroanthraquinonyl-(6')]-5,6-phthaloylbenzoxazole is reacted as described in Example 1 with 18.3 parts of 1-aminoanthraquinone, 9.6 parts of anhydrous sodium carbonate, 2.4 parts of anhydrous sodium acetate, 0.1 part of copper oxide and 400 parts of naphthalene. 30 parts of a reddish blue powder is obtained which dissolves in concentrated sulfuric acid with a green color.

2-[1',4'-dichloroanthraquinonyl-(6')] - 5,6 - phthaloyl-benzoxazole is obtained by reaction of the acid chloride of 1,4-dichloroanthraquinone-6-carboxylic acid with 2-amino-3-hydroxyanthraquinone in o-dichlorobenzene with the addition of a catalytic amount of p-toluenesulfonic acid.

Example 4

25 parts of the trianthrimide obtainable according to the second paragraph of this example is introduced at 100° C. into a melt consisting of 200 parts of aluminum chloride and 50 parts of sodium chloride. The mixture is stirred under nitrogen for five hours at 120° C. The melt is then poured into dilute hydrochloric acid. The deposited crude dye is filtered off with suction and aftertreated with sodium bichromate in dilute sulfuric acid. 22.5 parts of a dark powder is obtained which dissolves in concentrated sulfuric acid with a grey blue color and dyes cotton red brown shades having very good fastness from a yellow brown vat.

14 parts of 2 - [1',4' - diaminoanthraquinonyl - (6')]-benzoxazole and 22 parts of 5-chloroanthrapyrimidine-(1,9) are reacted with 9.6 parts of anhydrous sodium carbonate, 2.4 parts of anhydrous sodium acetate, 0.1 part of copper oxide and 350 parts of naphthalene as described in Example 1. 28 parts of a dark powder which dissolves in concentrated sulfuric acid with an olive green color is obtained.

2 - [1',4' - diaminoanthraquinonyl-(6')]-benzoxazole is obtained from the 2-[1',4'-dichloroanthraquinonyl-(6')]-benzoxazole obtainable according to the last paragraph of Example 1 by reaction with p-toluenesulfonamide and hydrolysis of the 1,4-di-p-tosylamino compound thereby obtainable with concentrated sulfuric acid at room temperature.

Example 5

25 parts of the trianthrimide obtainable according to the following paragraph is added to a melt consisting of 50 parts of aluminum chloride and 150 parts of pyridine. The mixture is stirred for three hours at 120° C., the melt poured into dilute hydrochloric acid and the residue filtered off with suction. The crude dye is after-treated in dilute sulfuric acid with sodium bichromate. 22 parts of a dark powder is obtained which dissolves in concentrated sulfuric acid with a green color and dyes cotton grey shades having very good fastness from a red brown vat.

16.4 parts of 2-[1',4'-dichloroanthraquinonyl-(6')]-benzothiazole and 29.5 parts of 1-amino-4-benzoylamino-anthraquinone are reacted in 500 parts of naphthalene with 9.6 parts of anhydrous sodium carbonate, 2.4 parts of anhydrous sodium acetate and 0.1 part of copper oxide in the manner described in the second paragraph of Example 1. 36 parts of a grey green powder is obtained which is soluble in concentrated sulfuric acid with a yellow green color.

2 - [1',4'-dichloroanthraquinonyl-(6')]-benzothiazole is obtained by reaction of the acid chloride of 1,4-dichloro-anthraquinone-6-carboxylic acid with o-aminophenol in o-dichlorobenzene.

Example 6

The procedure of the first paragraph of Example 5 is followed but 25 parts of the trianthrimide obtainable according to the following paragraph is used instead of 25 parts of the trianthrimide specified in Example 5. 24 parts of a dark powder soluble in concentrated sulfuric acid with a blue violet color is obtained which dyes cotton dark brown shades having very good fastness from a red brown vat.

The trianthrimide is prepared by following the procedure of the second paragraph in Example 1 but using 17.2 parts of 2-[1',4'-dichloroanthraquinonyl-(6')]-6- chlorobenzothiazole instead of 15.8 parts of 2-[1',4'-dichloroanthraquinonyl-(6')]-benzoxazole. 27 parts of a reddish blue powder is obtained which is soluble in concentrated sulfuric acid with a green color.

2 - [1',4' - dichloroanthraquinonyl-(6')]-6-chlorobenzothiazole is obtained by reaction of the acid chloride of 1,4-dichloroanthraquinone-6-carboxylic acid with 2-amino-5-chlorothiophenol in o-dichlorobenzene.

*Example 7*

25 parts of the trianthrimide obtainable according to the following paragraph is carbazolated as described in Example 5. 21.5 parts of a dark powder is obtained which dissolves in concentrated sulfuric acid with a blue green color and which dyes cotton brown shades of very good fastness from a brown violet vat.

21.6 parts of 2-[1',4'-dichloroanthraquinonyl-(6')]-4,5-phthaloylbenzothiazole, 29.5 parts of 1-amino-5-benzoylaminoanthraquinone, 9.6 parts of anhydrous sodium carbonate, 2.4 parts of anhydrous sodium acetate, 0.1 part of copper oxide and 500 parts of naphthalene are reacted as described in the second paragraph of Example 1. 35 parts of a dark powder soluble in concentrated sulfuric acid with a green color is obtained.

2 - [1',4' - dichloroanthraquinonyl - (6')] - 4,5-phthaloylbenzothiazole is obtained according to the last paragraph of Example 1 but using 1-amino-2-mercaptoanthraquinone instead of o-aminophenol and working without catalyst.

*Example 8*

25 parts of the trianthrimide obtainable according to the next paragraph is introduced at 100° C. into a melt which consists of 50 parts of aluminum chloride and 150 parts of pyridine. The temperature of the reaction mixture is increased to 140° C., some pyridine being distilled off, and the mixture is then stirred for five hours at this temperature. The melt is poured into an excess of dilute caustic soda solution and the deposited dye is after-treated with bleaching powder liquor. 23 parts of a dark powder is obtained which is soluble in concentrated sulfuric acid with an olive brown color and which dyes cotton brown shades having excellent fastness from a brown vat.

The procedure of the second paragraph of Example 7 is followed but 21.6 parts of 2-[1',4'-dichloroanthraquinonyl-(6')]-5,6-phthaloylbenzothiazole is used instead of 21.6 parts of the corresponding 4,5-phthaloyl compound. 36 parts of a dark powder is obtained which is soluble in concentrated sulfuric acid with a green color.

2 - [1',4' - dichloroanthraquinonyl - (6')]-5,6-phthaloylbenzothiazole is obtained according to Example 1, last paragraph, using 2-amino-3-mercaptoanthraquinone instead of o-aminophenol.

*Example 9*

22 parts of the dianthrimide obtainable according to the following paragraph is introduced at room temperature into a solution of 60 parts of aluminum chloride in 250 parts of nitrobenzene. A slightly exothermic reaction sets in soon afterward. The mixture is stirred for one hour at room temperature, a little hydrochloric acid is added and the whole subjected to steam distillation. The dye is filtered off with suction and dried. 21.5 parts of a brown powder is obtained which is soluble in concentrated sulfuric acid with a red violet color and dyes cotton copper colored shades having very good fastness from a brown violet vat.

13.6 parts of 2-[1'-aminoanthraquinonyl-(6')]-benzoxazole or 2-[1'-aminoanthraquinonyl-(7')]-benzoxazole, 14.8 parts of 1-chloro-4-benzoylaminoanthraquinone, 5 parts of anhydrous sodium carbonate, 1.2 parts of anhydrous sodium acetate, 0.1 part of copper oxide and 250 parts of naphthalene are boiled for six hours. 125 parts of chlorobenzene is then added to the mixture which is then worked up as described in the second paragraph of Example 1. 23 parts of a blue violet powder is obtained which is soluble in concentrated sulfuric acid with an olive green color.

2-[1'-aminoanthroquinonyl-(6')]-benzoxazole and 2-[1'-aminoanthraquinonyl-(7')]-benzoxazole are obtained by reacting the chlorides of 1-nitroanthraquinone-6-carboxylic acid and 1-nitroanthraquinone 7-carboxylic acid, respectively, with o-aminophenol in o-dichlorobenzene with the addition of a catalytic amount of p-toluenesulfonic acid and subsequent reduction of the nitro group.

*Example 10*

25 parts of the trianthrimide obtainable according to the next paragraph is carbazolized as described in the first paragraph of Example 5. 24 parts of a dark powder is obtained which dissolves in concentrated sulfuric acid with an olive color and which dyes cotton red brown shades having very good fastness from a yellow brown vat.

A mixture of 2-[1'-chloroanthraquinonyl-(6')]-benzoxazole (or 2 - [1' - chloroanthraquinonyl - (7')]-benzoxazole), 22 parts of 4-amino1,1'-dianthrimide, 6 parts of anhydrous sodium carbonate, 1.5 parts of anhydrous sodium acetate, 0.1 part of copper oxide and 200 parts of naphthalene is boiled for six hours. The mixture is then diluted with 100 parts of chlorobenzene and thereafter the procedure of the second paragraph of Example 1 is followed. 30 parts of a dark powder is obtained which is soluble in concentrated sulfuric acid with a green color.

2-[1'-chloroanthraquinonyl-(6')]-benzoxazole (or the corresponding (7')-compound) is obtained by reaction of 1-nitroanthraquinone-6-carboxylic acid (or the corresponding 7-carboxylic acid) with sodium sulfite, conversion of the resultant anthraquinone-1-sulfonic acid-6-carboxylic acid (or -7-carboxylic acid) into the 1-chloroanthraquinone-6-carboxylic acid (or -7-carboxylic acid), formation of the acid chloride and reaction of the same with o-aminophenol according to the last paragraph of Example 1.

*Example 11*

25 parts of the trianthrimide obtainable according to the following paragraph is carbazolized as described in the first paragraph of Example 5. 24 parts of a dark powder which is soluble in concentrated sulfuric acid with a blue grey color is obtained which dyes cotton brown shades having excellent fastness from a brown vat.

15.8 parts of 2-[1',4'-dichloroanthraquinonyl-6')]-benzoxazole, 9 parts of 1-aminoanthraquinone, 14.1 parts of 1-amino-5-benzoyl-aminoanthraquinone, 9.6 parts of anhydrous sodium carbonate, 2.4 parts of anhydrous sodium acetate, 0.1 part of copper oxide and 200 parts of nitrobenzene are boiled for twelve hours. The residue is filtered off with suction at 120° C., washed with hot nitrobenzene, then with chlorobenzene and finally with methanol and it is then boiled up with dilute hydrochloric acid. 28 parts of a dark powder which is soluble in concentrated sulfuric acid with a green color is obtained.

The production of 2-[1',4'-dichloroanthraquinonyl-(6')]-benzoxazole is described in the last paragraph of Example 1.

*Example 12*

25 parts of the trianthrimide obtainable according to the following paragraph is carbazolized in the way described in the first paragraph of Example 5. 24 parts of a dye is obtained which has similar properties to the dye obtainable according to Example 11.

A mixture of 14 parts of 2-[1',4'-diaminoanthraquinonyl-(6')]-benzoxazole, 9.7 parts of 1-chloroanthraquinone, 9.6 parts of anhydrous sodium carbonate, 2.4 parts of anhydrous sodium acetate, 0.1 part of copper oxide and 200 parts of naphthalene is boiled for eight hours. 15.2 parts of 1-chloro-5-benzoylaminoanthraquinone is added and the mixture kept boiling for another eight hours. The mixture is worked up as described in the second paragraph of Example 1. 33 parts of a dark powder is obtained which is soluble in concentrated sulfuric acid with a green color.

The production of 2-[1',4'-diaminoanthraquinonyl-(6')]-benzoxazole is described in the last paragraph of Example 4.

Example 13

25 parts of the trianthrimide obtainable according to the second paragraph of this example is introduced at 100° C. into a melt consisting of a mixture of 50 parts of aluminum chloride and 150 parts of pyridine. The reaction mixture is stirred for three hours at 120° C. The melt is poured into an excess of aqueous caustic soda solution and then 60 parts of chloride of lime liquor is added in small portions at 80° C. The precipitate is then filtered off with suction, washed with water until neutral and dried. 23 parts of a dark powder is obtained which is soluble in concentrated sulfuric acid with a reddish blue color and dyes cotton brown shades having excellent fastness from a red brown vat.

20.5 parts of 2-[1',4'-dichloroanthraquinonyl-(6')]-benzothiazole is reacted with 23.5 parts of 1-aminoanthraquinone, 12 parts of anhydrous sodium carbonate, 3 parts of anhydrous sodium acetate, 0.1 part of copper oxide and 400 parts of naphthalene as described in the second paragraph of Example 1. 31.5 parts of a grey powder is obtained which dissolves in concentrated sulfuric acid with a green color.

2-[1',4'-dichloroanthraquinonyl-(6')]-benzothiazole is obtained in the way described in the last paragraph of Example 5.

Example 14

25 parts of the trianthrimide obtainable according to the second paragraph of this example is carbazolized and worked up in the way described in the first paragraph of Example 13. 23.5 parts of a dark powder is obtained which is soluble in concentrated sulfuric acid with a blue violet color and which dyes cotton khaki shades having very good fastness from a red brown vat.

20.2 parts of 2-[1',4'-dichloroanthraquinonyl-(6')]-4,5-phthaloyl-benzothiazole is reacted with 17.2 parts of 1-amino-anthraquinone, 9 parts of anhydrous sodium carbonate, 2.3 parts of anhydrous sodium acetate, 0.1 part of copper oxide and 250 parts of naphthalene as described in the second paragraph of Example 1. 30 parts of a grey blue powder is obtained which is soluble in concentrated sulfuric acid with a green color.

2 - [1',4' - dichloroanthraquinonyl-(6')]-4,5-phthaloyl-benzothiazole is obtained in the way described in the last paragraph of Example 8.

Example 15

25 parts of the dianthrimide obtainable according to the second paragraph of this example is introduced at room temperature into a solution of 70 parts of aluminum chloride in 300 parts of nitrobenzene and stirred for another four hours. Then a little hydrochloric acid is added and a steam distillation is carried out. The residue is filtered off with suction and washed with water to neutrality and to the absence of aluminum salt in the wash water. 25 parts of a dark powder is obtained which is soluble in concentrated sulfuric acid with a red violet color and which dyes cotton olive shades having very good fastness from an olive brown vat.

14.9 parts of 4,3',5'-trichloroanthraquinone-2,1(N)-1',2'(N)-benzene acridone is boiled for seven hours with 14 parts of 2-[1'-aminoanthraquinonyl-(6')]-benzothiazole, 4.8 parts of anhydrous sodium carbonate, 1.2 parts of anhydrous sodium acetate, 0.2 part of copper oxide and 250 parts of naphthalene. The mixture is then diluted with 125 parts of chlorobenzene and worked up as described in the second paragraph of Example 1. 19 parts of a grey blue powder is obtained which is soluble in concentrated sulfuric acid with a yellow brown color.

2 - [1' - aminoanthraquinonyl-(6')]-benzothiazole is obtained analogously to the third paragraph in Example 9 by starting from 1-nitroanthraquinone-6-carboxylic acid, by using o-aminothiophenol instead of o-aminophenol and by working without catalyst.

We claim:
1. The dye of the formula:

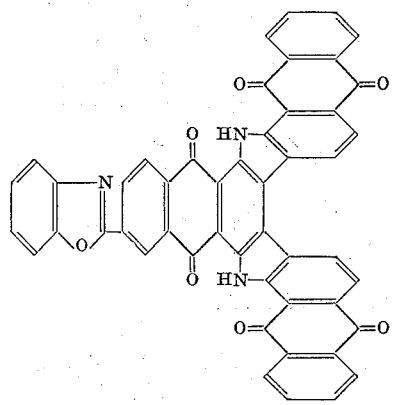

2. The dye of the formula:

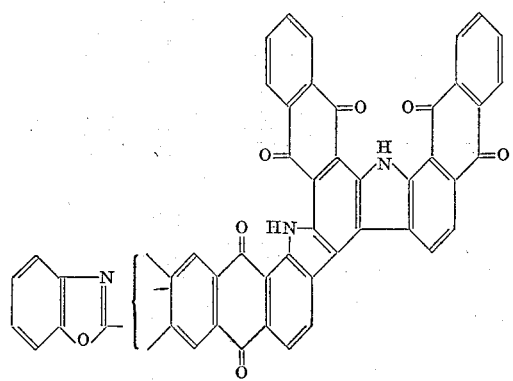

3. The dye of the formula:

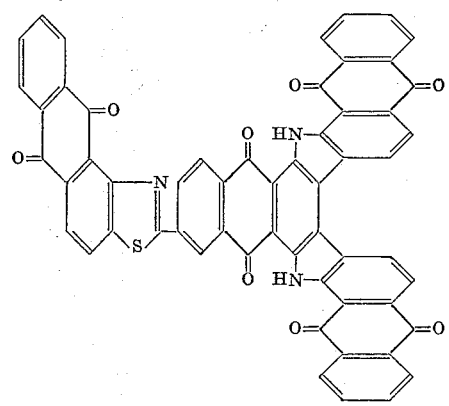

4. The dye of the formula:

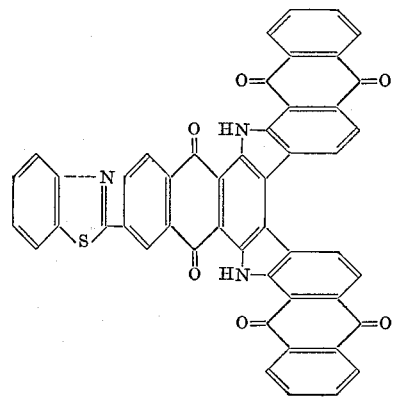

5. The dye of the formula:

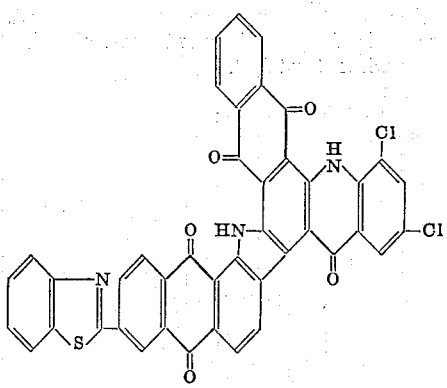

6. A dye of the formula

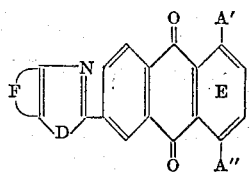

in which at least one of the substituents A represents a member selected from the group consisting of

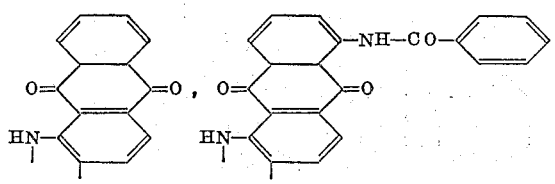

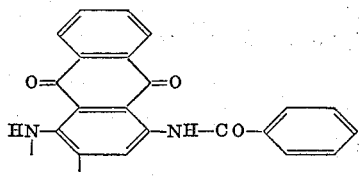

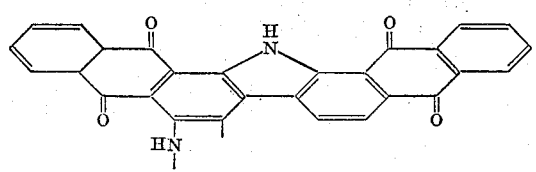

and

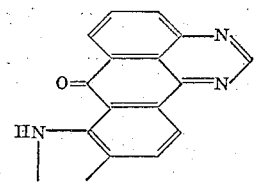

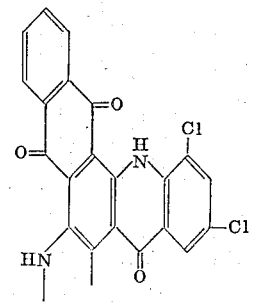

wherein the —NH— bridge is attached to the α-position of ring E and said substituent is further attached by its other free valency to the carbon atom in β-position of the ring E so as to form a carbazole, any remaining A denotes a hydrogen atom, D is a divalent radical selected from the group consisting of —S— and —O— and F is a divalent radical selected from the group consisting of

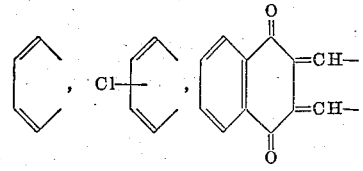

and

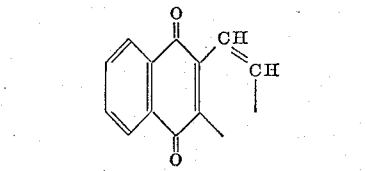

References Cited by the Examiner

UNITED STATES PATENTS 2,043,985  6/1936  Beard _____ 260—276

FOREIGN PATENTS 802,681  10/1958  Great Britain.

NICHOLAS S. RIZZO, *Primary Examiner.*

DONALD G. DAUS, *Assistant Examiner.*